Figure 1:
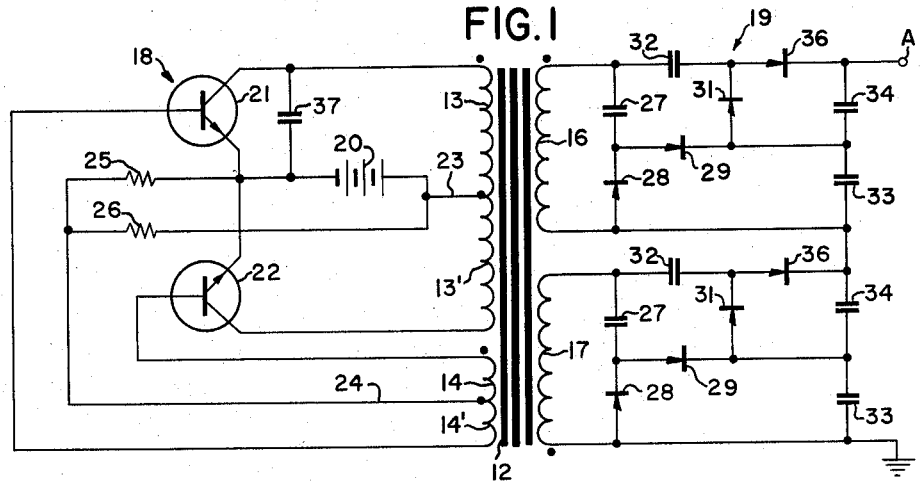

March 29, 1966  J. W. ACKLEY  3,243,683
DIRECT CURRENT CONVERTER WITH VOLTAGE MULTIPLICATION
Filed Nov. 29, 1961

INVENTOR.
JAMES W. ACKLEY
BY
ATTORNEY

United States Patent Office 3,243,683
Patented Mar. 29, 1966

3,243,683
DIRECT CURRENT CONVERTER WITH VOLTAGE MULTIPLICATION
James W. Ackley, Los Altos, Calif., assignor to Varian Associates, Palo Alto, Calif., a corporation of California
Filed Nov. 29, 1961, Ser. No. 155,634
5 Claims. (Cl. 321—2)

This invention relates to a direct current converter and more particularly to an improved direct current converter that produces about 3000 volts and has an efficiency of at least 70% at an output power of 150 milliwatts.

There are many applications where direct current at low power and at about 3000 volts is needed. One such application is a sputter-ion vacuum pump where, for example, a sputter-ion vacuum pump is fixed as an appendage to large vacuum tubes, such as klystrons, and traveling wave tubes, etc. The sputter-ion vacuum pump requires a power supply capable of supplying about 3000 volts. Since the pump would be pumping on a very low pressure (less than $10^{-6}$ millimeters of mercury), the current demand would be very low (less than 100 microamperes). Many applications require that these pumps operate full time at locations where suitable power supplies are not available, for example during transportation of the vacuum tubes by truck, railroad, etc. Portable high voltage power supplies must be provided from simple, readily available battery sources. Available direct current converters, although they could supply 3000 volts, are very inefficient at low power requirement wherein they used at least three times as much battery power as compared to the power the pump demands from the converter. Also, available direct current converters draw excessive primary current if the secondary happens to be short-circuited making them unsafe in operation when unattended.

An object of this invention is to provide a safe low power, high voltage, direct-current converter that has improved efficiency and will multiply a low direct-current voltage, as for example, from a battery source.

One feature of this invention is a transistorized multivibrator inverter circuit for the primary circuit of a transformer.

Another feature of this invention is a transformer for multiplying voltages at least 200 times with the ratio of secondary coil turns to the ratio of primary coil turns being less than 40 to 1, and the number of secondary coil turns being 3500 or less.

Another feature of this invention is a transistorized inverter circuit having a direct current power supply for the primary of a transformer that operates at a frequency of less than one kilocycle.

Another feature of this invention is a voltage multiplier circuit in combination with a secondary coil of a transformer to increase the voltage output and limit the current in the primary when the secondary is short circuited.

Another feature of this invention is multiple secondary coils on a transformer to reduce the total capacitance losses in the coils and the secondary coils are chosen in multiples of two so that the coils are polarized in opposite directions and balanced full-wave rectification is obtained.

Figure 2:
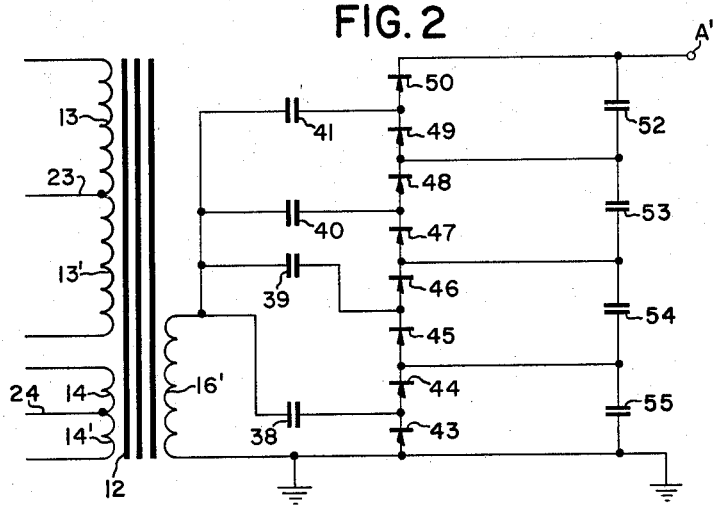

These and other features and advantages of the present invention will be more apparent after a perusal of the following specification taken in connection with the accompanying drawings wherein, FIG. 1 is a schematic circuit drawing of a novel converter constructed in accordance with the teachings of the present invention; and FIG. 2 is an alternate embodiment of the secondary voltage multiplier circuit.

Referring to the drawings and to FIG. 1 in particular, there is shown a transformer having an iron core 12 (shown schematically), primary coils 13 and 13' and 14 and 14', and two secondary coils 16 and 17. A direct current multivibrator, inverter circuit 18 is connected to the primary coils 13 and 13' and 14 and 14' and a voltage multiplier circuit 19 is connected to the secondary coils 16 and 17. The circuit 19 converts and multiplies the alternating voltage induced in coils 16 and 17 to a higher direct voltage.

The inverter circuit 18 switches current on and off in either of the primary coils 13 and 13', and includes a direct current power supply, preferably in the form of a battery 20, and two transistors 21 and 22 (NPN type transistors as shown and described with this invention). Transistors are preferred since they are more efficient than vacuum or gas tubes. The battery 20 has a positive terminal connected to a lead 23, the junction of primary coils 13 and 13'. Coils 13 and 13' are preferably one continuously wound coil with the lead 23 connected to a turn located midway between the ends of the continuous coil so that primary coils 13 and 13' have substantially the same number of turns all wound in the same direction, and they have aligned polarity as indicated by the dot at one end of the continuous coil. The emitters of each NPN transistor 21 and 22 are connected to the negative terminal of the battery 21 (but, if the transistors are P-N-P types, the positive terminal of the battery should be conneced to the emitters; the arrow on the emitters indicates the direction of current flow). The collector of each transistor 21 and 22 is connected one to each end of the coils 13 and 13' respectively. The primary coils 14 and 14' are wound similar to primary coils 13 and 13' but contain fewer turns. A lead 24 is connected to the center turn of the continuous coil 14–14'. The coils 14 and 14' are wound so that the magnetic field produced by the coils is polarized in the same direction with the magnetic field produced by coils 13 and 13' as shown by the dot at the end of the coils. Each transistor base is connected to the ends of each primary coil 14 and 14' respectively while the lead 24 is biased to a potential between the emitter and collectors of transistors 21 and 22 by voltage divider formed by two resistors 25 and 26 connected across the battery 20.

The voltage multiplier circuit 19 consists of two voltage-quadrupler circuits connected one to each secondary coil 16 and 17. Each quadrupler circuit has a capacitor 27 and a diode 28 connected in parallel with each coil 16 and 17. In parallel with capacitor 27 is connected a series circuit including diode 29, another diode 31, and a capacitor 32. Between the junction of diode 28 and either coil 16 and 17 and the junction of diodes 29 and 31 is connected another capacitor 33. In parallel with diode 31 is series connected a capacitor 34 and a diode 36. The junction of capacitor 33 and coil 16 is connected to the junction of diode 36 and capacitor 34 on coil 17. All the diodes 28, 29, 31, and 36 in both quadrupler circuits are aligned with each other so that current flows from the junction of coil 17 and diode 28 to a point A that is the junction of diode 36 and capacitor 34 of the circuit including coil 16.

The inverter circuit 18 operates as follows: when the battery is first connected, the current from the battery would tend to divide into both coils 13 and 13'. A capacitor 37 is connected across one transistor, for example, transistor 21, so that a surge of current is formed in coil 13. As the current in coil 13 increases, the base of transistor 21 is biased by the induced electromotive force (E.M.F.) in coils 14 and 14' to cause the current through the transistor 21 to rapidly reach saturation while the base of transistor 22 is biased by coils 14 and 14' to cutoff the current through it. Then, when the magnetic field in the core 12 is steady, no induced electromotive force is formed in coil 14 and 14' removing the bias from the base of transistor 21 and cutting off the current through coil 13. The magnetic field that was formed collapses to bias the base of transistor 22 causing the current to flow therethrough. The current through the transistor is rapidly saturated, and the full current now flows in coils 13' to reverse the magnetic field within the core 12. When the magnetic field is again steady, the bias is removed from the base of transistor 22 cutting off the current in coil 13' collapsing again the magnetic field to cause current to flow again in coil 13. The procedure repeats itself as long as the battery supplied power to coils 13 and 13'. The voltage divider formed by resistors 25 and 26 biases the base of the transistor to a potential wherein the collector current of the transistor could be limited even under increased load conditions.

The operation of each voltage quadrupler circuit of the voltage multiplier circuit 19 can best be described by assuming capacitor 32 and diode 29 disconnected from the circuit. Then the voltage swing across capacitor 27 is equal to the peak of peak voltage of alternating voltage induced in either coil 16 or 17 since current flows one way through diode 28. If diode 29 is now connected to capacitor 27 the voltage developed across capacitor 27 would charge capacitor 33 to twice the peak voltage of the alternating voltage and the capacitor 33 remains charged until it is discharged.

Capacitor 32, like capacitor 27 would also swing through twice the peak voltage of the alternating voltage; and capacitor 34, like capacitor 33 would also be charged to twice the peak voltage of the alternating voltage. The voltage of the four capacitors 33 and 34 add to eight times the peak voltage of the alternating voltage. The voltage multiplying circuits have inherently poor voltage regulation due to its capacitive reactance current limitation.

Transformer losses occur primarily within the core 12, within the secondary windings, and within the primary windings. The core losses are magnetizing or hysteresis losses, and the secondary winding losses are capacitive. Both these losses increase with increasing frequency of alternating current. The primary windings are current losses in the primary circuit.

The capacitive losses in the secondary winding are related to the number of turns in the coil and to the voltage induced therein, and are inversely related to the frequency of the inverter circuit. The frequency of the inverter circuit is determined by the equation:

$$E_1 = K B_{max} A f N_1 \quad (1)$$

wherein K is a constant and equal to $4 \times 10^{-8}$, $B_{max}$ is the maximum saturation flux density of the core material in gauss, A is the core cross section area in square centimeters, $f$ is the switching frequency in cycles per second of the inverter circuit, $N_1$ is the number of turns in the primary coil, and $E_1$ is the voltage of the power supply 20. The induced voltage in the secondary is determined by the equation:

$$\frac{E_1}{E_2} = \frac{N_1}{N_2} \quad (2)$$

where $E_1$ and $N_1$ are the same as for Equation 1, $E_2$ is the peak induced voltage in the secondary, and $N_2$ is the number of turns in the secondary.

Thus from Equation 1, the frequency could be decreased by increasing $N_1$ provided that $B_{max}$ and A are constant. Then if a given value of $E_2$ must be maintained, Equation 2 states that $N_2$ should be increased. Thus a condition is produced where in one manner the capacitive losses are increased and in the opposite manner they are decreased. The optimum frequency could be determined where the total capacitive losses due to the frequency and windings is a minimum. In the device described herein the minimum capacitive losses occurred at a frequency slightly lower than 1000 cycles per second.

At 1000 cycles the number of primary turns were found to be too low in that the current therein had to be quite large to produce the required magnetizing force. This relation is stated by the following equation:

$$.4 \pi N_1 I_1 = HL \quad (3)$$

where $N_1$ is again the number of turns in the primary, $I_1$ is the current in the primary, H is the magnetizing force in oersteds, and L is the average length of the magnetic path in centimeters. Since the current $I_1$ could be increased by lowering the frequency, the total losses including capacitance losses and primary winding losses were found to be a minimum at 750 cycles per second.

Equation 1 also states that a high flux density and a large core cross section area also help lower the operating frequency of the inverter circuit. For a given magnetizing force H a higher flux density is produced by a core material with a high permeability. Therefore, a material with a high permeability is desirable over a material with a low permeability even though the low permeability material saturates at a higher flux density.

Equation 1 also states that a higher value of $B_{max}$ allows the use of a smaller number of primary turns for a given frequency and voltage and therefore a smaller number of secondary turns. Thus a smaller core area could be used with the higher $B_{max}$ material and still maintain the required frequency. To reduce indefinitely the core area with increasing $B_{max}$ is impractical as the primary turns could not be reduced without increasing primary losses as the magnetizing force needs to be maintained. There are mechanical fabrication problems in winding the core that limits the size of the core. A core should be chosen with sufficient window area to allow the coils to be wound therein. Then the magnetic path cross section area is determined by the maximum number of turns the primary coil should have and still fit on the core remembering that the magnetic path increases with core area and the window area is constant. The magnetic material is now chosen with the highest available permeability that saturates at least above the value $B_{max}$ as determined by Equation 1.

Experiments have shown that a core material having a maximum permeability of no less than 70 kilogauss/oersteds and having a saturation flux density between 5 and 7 kilogauss would produce a converter that has maximum efficiency. (The term maximum permeability is used because magnetic materials, in general, have a range of permeability as determined by the instantaneous slope of the hysteresis curve.)

Referring to FIG. 2 another embodiment of the voltage multiplier circuit 19 of FIG. 1 is shown (like number items represent similar items as in FIG. 1). The multiplier circuit 19' of FIG. 2 multiplies the voltage across one secondary coil 16' eight times, the coil 16 could be the same as coil 16 in FIG. 1, developing same E.M.F. as coil 16.

To one end of coil four capacitors 38–41 are connected in parallel. Between the capacitor 38 and the other end of the coil is connected a diode 43, and between capacitors 38 and 39 are series connected two diodes 44 and 45, between capacitors 39 and 40 are series connected diodes 46 and 47, and between capacitors 40 and 41 are series connected diodes 48 and 49. To the junction of diode 49 and capacitor 41 is connected a diode 50. Four capacitors 52–55 are connected in series between the junction of diode 43 and coil 16' and to the free end of diode 50. The junction of capacitors 54 and 55 is connected to the junction of diodes 44 and 45, while the junction of capacitors 53 and 54 is connected to the junction of diodes 46 and 47 and the junction of capacitors 52 and 53 is connected to junction of diodes 48 and 49. The diodes 43 to 50 are aligned so that current flows from the junction of diode 43 and coils 16' to a point A'. One skilled in the art can readily understand that each capacitor 52–55 would be charged to twice the alternating voltage that is induced across coil 16' and their voltages add to form eight times the peak-coil-voltage between point A' and ground.

The voltage multiplier circuit of FIG. 1 is more desirable than the voltage multiplier circuit 19' for several reasons. For example, the power output for circuit 19 (FIG. 1) is practically doubled for a transformer of a given size as the coils 16 and 17 are connected so power is drawn from each half cycle of the induced alternating voltage, and thus the efficiency is enhanced. The multiplying circuit of FIG. 2 tends to be "softer" than the multiplying circuit of FIG. 1 as multiplying current has the inherent characteristics of becoming "softer" with increases in the multiplication factor. Softness refers to the characteristics of the multiplying circuits where the no-load voltage rapidly diminishes under load. Thus, if the no-load voltage of the embodiment of FIGS. 1 and 2 are the same, then under load conditions the voltage of the circuit in FIG. 1 would be larger than the voltage of the circuit in FIG. 2. When two secondary coils are connected in parallel the capacitive losses tend to add arithmetically, but if two secondary coils are series connected the capacitive losses inherently increase almost geometrically.

A high efficiency, high voltage direct current converter that has an efficiency of 70% at power output levels of 150 milliwatts is produced by using as low a frequency as possible, using multiple secondary windings in units of two, using voltage multiplying circuits to keep secondary turns low, using as high a number of primary turns as possible to reduce magnetizing current and frequency using an annular core with a small length, using as core material a substantially square hysteresis loop, using core material with a low saturation flux density, or using any combination of the above features.

A direct current converter was built using the above teachings that included the circuit embodiment as shown in FIG. 1. When the power output was 150 milliwatts at 3 kilovolts an efficiency as high as 70% was obtained. When the power output was lowered to 30 milliwatts at 3 kilovolts the efficiency dropped to about 50%. Each secondary coil 16 and 17 had 3000 turns while primary coils 13 and 13' had 100 turns each. Primary coils 14 and 14' had 10 turns each. Resistor 25 was 300 kilohms and resistor 26 was ten kilohms so that the 12 volts produced by the battery 21 was divided wherein the junction of resistors 25 and 36 was biased to 12/31 volts above the potential of the battery terminal connected to the resistor 25. The core material saturated at a flux density of 6000 gauss and had a hysteresis loop that was 93% square or a permeability of 100,000 gauss/oersted units.

Since many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

What is claimed is:

1. A direct current to direct current converter, comprising in combination, a multivibrator comprising a pair of alternately conducting transistors, each of said transistors having a collector, base and emitter electrode; a saturable transformer having at least two primary windings and at least two secondary windings; the collectors of said transistors being connected to opposite ends of said first primary winding, the bases of said transistors being connected to the opposite ends of said second primary winding, said primary windings being oriented to conduct current in the same direction; a direct current source connected to the emitters of said transistors and in series between the midpoint of said first primary winding and the midpoint of said second primary winding; a voltage multiplier circuit connected to each secondary winding for multiplying and rectifying the voltage induced in said secondary winding, said secondary windings being oriented to conduct current in opposite directions, said voltage multiplier circuit including a first capacitor and a first diode connected in parallel with said secondary winding, a series circuit including a second and third diode and a second capacitor connected in parallel with said first capacitor, a third capacitor connected between the junction of said second and third diode and the junction of said secondary winding and said first diode, and a series connected circuit including a fourth diode and a fourth capacitor connected in parallel with said second diode.

2. The converter according to claim 1 including means for connecting said voltage multiplier circuits in such a manner that their voltages are added together.

3. A voltage multiplier circuit for multiplying and rectifying an A.C. signal induced in the secondary winding of a transformer including a first capacitor and a first diode connected in parallel with said secondary winding, a series circuit including a second and third diode and a second capacitor connected in parallel with said first capacitor, a third capacitor connected between the junction of said second and third diode and the junction of said secondary winding and said first diode and a series connected circuit including a fourth diode and a fourth capacitor connected in parallel with said second diode.

4. A direct current to direct current converter comprising a source of low voltage direct current potential, a saturable transformer having at least two primary windings and two secondary windings, a pair of transistors alternately conductive connected to supply current from said direct current source to said primary windings alternately and in opposing directions, a voltage multiplier circuit connected to each secondary winding for multiplying and rectifying the voltage induced in said secondary winding, said secondary windings being oriented to conduct current in opposite directions, said voltage multiplier circuit including a first capacitor and a first diode connected in parallel with said secondary winding, a series circuit including a second and third diode and a second capacitor connected in parallel with said first capacitor, a third capacitor connected between the junction of said second and third diode and the junction of said secondary winding and said first diode and a series connected circuit including a fourth diode and a fourth capacitor connected in parallel with said second diode.

5. The converter according to claim 4 including means for connecting said voltage multiplier circuits in such a manner that their voltages are added together.

References Cited by the Examiner

UNITED STATES PATENTS

| 2,954,531 | 9/1960 | Johnson | 321—2 |
| 2,967,989 | 1/1961 | Eno et al. | 321—2 |
| 3,171,077 | 2/1965 | Murphy et al. | 321—2 |

FOREIGN PATENTS

| 532,551 | 1/1941 | Great Britain. |

OTHER REFERENCES

Radio-Electronics, "Seven Unusual Power Supplies," by Lyman E. Greenlee, March 1950, page 54 et sequens.

Electronic Designers' Handbook, Landee, Davis and Smith, McGraw-Hill Book Company, 1957 (sec. 14–13).

"Battery Powered Converter Runs Multiplier Phototube," by R. P. Rufer (July 8, 1960), published by Electronics, vol. 33, No. 28, page 51.

LLOYD McCOLLUM, *Primary Examiner.*